(No Model.)
T. GOULD.
NOZZLE FOR HOSE PIPES.
No. 259,131.   Patented June 6, 1882.
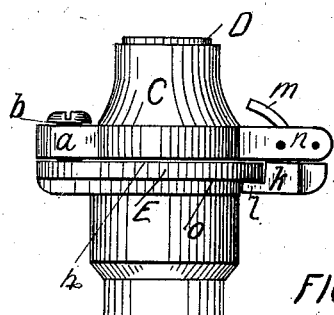
FIG. 1.
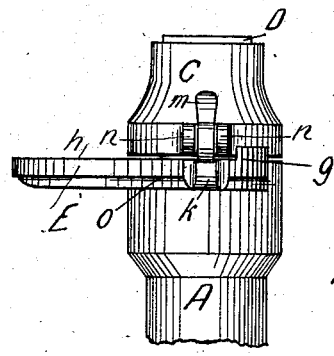
FIG. 3.
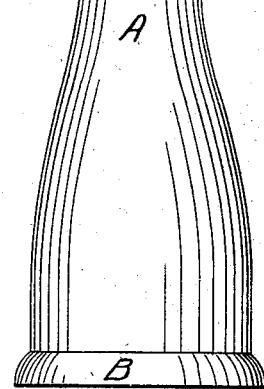
FIG. 2.
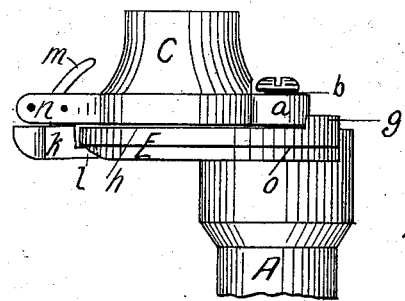
FIG. 4.
FIG. 7.
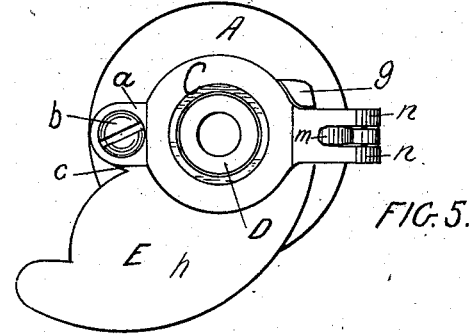
FIG. 5.
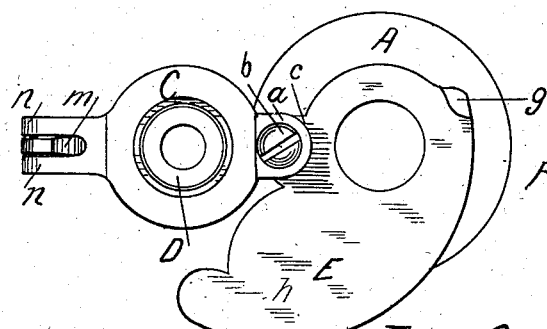
FIG. 6.
THOS. GOULD.
Inventor.
PER Brown Bros.
Attorneys.
Witnesses:

UNITED STATES PATENT OFFICE.

THOMAS GOULD, OF WAKEFIELD, ASSIGNOR OF ONE-HALF TO OSCAR I. STOWELL, OF LYNNFIELD, MASSACHUSETTS.

NOZZLE FOR HOSE-PIPES.

SPECIFICATION forming part of Letters Patent No. 259,131, dated June 6, 1882.

Application filed October 31, 1881. (No model.)

*To all whom it may concern:*

Be it known that I, THOMAS GOULD, of Wakefield, in the county of Middlesex and State of Massachusetts, have invented certain new and useful Improvements in Nozzles for Hose-Pipes, of which the following is a full, clear, and exact description.

The object of this invention is to adapt a hose pipe or nozzle to be readily and easily changed from one size or form of stream to another without necessarily requiring the arrest of the passage of the water through the hose or hose-pipe.

To this end it consists principally in a division of the hose pipe or nozzle at right angles to its length into two parts, which together make a continuous passage through the pipe, and are pivoted or swiveled to each other for the one to be swung across the other and to bring its water-passage out of line with the other, and thereby expose such passage for a thimble-shaped tube, either to reduce the size or change the form of such stream or passage, or for a solid plug to stop or close such passage, to be placed in it, and to be then swung into proper line with the passage through the other part of the nozzle or pipe. In addition to the above the hose pipe or nozzle is provided with a guard at its side to protect the person holding and manipulating the hose-pipe against being spattered in making changes in the nozzle such as above described.

In the accompanying plate of drawings, Figure 1 is an elevation of a hose pipe or nozzle of my improved construction, with the water-passage of the two parts in line with each other; Fig. 2, a longitudinal section of Fig. 1; Fig. 3, an elevation of the nozzle proper, the same as in Fig. 1, except it is from a different side to that of Fig. 1; Fig. 4, an elevation of the nozzle proper, the same as in Fig. 1, but with the nozzle end or part swung away from the other part of the hose pipe or nozzle; Figs. 5 and 6, plan views of Figs. 3 and 4, respectively; Fig. 7, a view in detail, which will hereinafter appear.

In the drawings, A represents a hose pipe or nozzle, adapted at its end B to be attached to a hose or pipe, as ordinarily. This pipe or nozzle, in and at right angles to its length, is in two parts, the one, C, making the nozzle proper or discharge. The nozzle C has an ear-piece, *a*, and at this ear-piece it is pivoted or swiveled through a pin, *b*, to an ear-piece, *c*, of the pipe A, and both of these ear-pieces are at right angles to the longitudinal axis of the pipe. The nozzle proper, C, is thus capable of being swung from the pipe, so as to place its water-passage in or out of line with the water-passage of the pipe A, and when swung out of line to be put into a position to expose its water-passage for the insertion or removal of a thimble, such as shown in Figs. 2 and 7, shaped to change the form and size of the water-passage according to the size and style of the stream desired.

The thimble D shown is shouldered at its inner end, as at *d*, to hold it by its abutment against and interlock with the shoulder *f* at the inner end of the nozzle proper against escape from the nozzle under the pressure of the water. Thimbles of various forms and styles obviously may be used.

The construction of the pipe as described enables the nozzle to be adapted to the kind of stream desired without necessarily arresting the passage of the water through the hose and pipe.

*g* is a stop on the pipe A to arrest the swing of the nozzle at the proper point to place its water-passage in line with the water-passage of the pipe A.

E is a guard-plate projecting from one side of the pipe, and having its face *h* in a parallel line with the plane of the junction of the two parts of the pipe. This guard protects the manipulator of the hose-pipe against being spattered from the water in swinging the nozzle C, as described.

*k* is a block hinged to the nozzle C, and projecting by its flange *l* under the guard E; and *m*, a lever hung to ear-pieces *n* of the nozzle C, and constructed and arranged at its end to work against the block *k*, and thus through such block enable the nozzle C to be held in close contact with the face *o* of the guard as the nozzle is being swung over such face.

Having thus described my invention, what

I claim, and desire to secure by Letters Patent, is—

1. The combination, with a hose pipe or nozzle A, of the swiveled laterally-swinging nozzle C, having an open unobstructed water-passage adapted to receive a detachable thimble, D, for changing the form of the stream, substantially as described.

2. The combination, with a hose-pipe or nozzle, A, provided with a laterally-projecting guard, E, having a plane outer face, $h$, of the swiveled nozzle C, arranged to swing laterally on the face of the guard and provided with an open water-passage constructed to receive a detachable thimble, substantially as described.

3. The combination, with a pipe or nozzle, A, provided with a laterally-projecting guard, E, having a fixed stop, $g$, of a swiveled laterally-swinging nozzle having a water-passage through it and adapted to strike the said stop when its water-passage is in coincidence with the passage in the pipe or nozzle, substantially as and for the purpose described.

4. A hose pipe or nozzle, A, and its part C hung to it, in combination with the lever $m$ and block $k$, all substantially as described, for the purposes specified.

5. A hose pipe or nozzle, A, and its part C hung to it and interiorly shouldered, in combination with an exteriorly-shouldered thimble, all substantially as and for the purpose specified.

In testimony whereof I have hereunto set my hand in the presence of two subscribing witnesses.

THOMAS GOULD.

Witnesses:
OSCAR I. STOWELL,
MARY E. STOWELL.